United States Patent
Slehofer

[15] 3,704,379
[45] Nov. 28, 1972

[54] ELECTRICAL SYSTEM FOR AN AUTOMATIC VEHICLE

[72] Inventor: Ladislaw Slehofer, Plessis-Robinson, France

[73] Assignees: Automobiles Peugeot, Paris; Regie Nationale Des Usines Renault, Billancourt, France; part interest to each

[22] Filed: June 28, 1971

[21] Appl. No.: 157,148

[30] Foreign Application Priority Data

July 3, 1970 France......................7024722

[52] U.S. Cl. ............307/10 LS, 307/10 R, 340/81 F, 315/77
[51] Int. Cl. ..............................................H02g 3/00
[58] Field of Search ........340/81, 81 F, 331, 332, 67, 340/76; 315/77, 84, 209, 217; 307/10 R, 10 LS

[56] References Cited

UNITED STATES PATENTS 3,452,248 6/1969 Leeder, Jr.................340/81 R
3,302,173 1/1967 Konz et al.................340/81 R Primary Examiner—Herman J. Hohauser
Attorney—Burns, Doane, Swecker & Mathis

[57] ABSTRACT

Electrical system for an automobile vehicle, comprising a plurality of apparatuses, such as direction-changing indicators, to be supplied with power. A main switch having an "on" contact is interposed between the apparatuses and the power source. A second switch is connected in series between the source and those of the apparatuses which are desired to operate in a cadenced manner. A cadenced signal generator is interposed between the "on" contact of the main switch and ground and is adapted to actuate the second switch in a cadenced manner.

5 Claims, 3 Drawing Figures

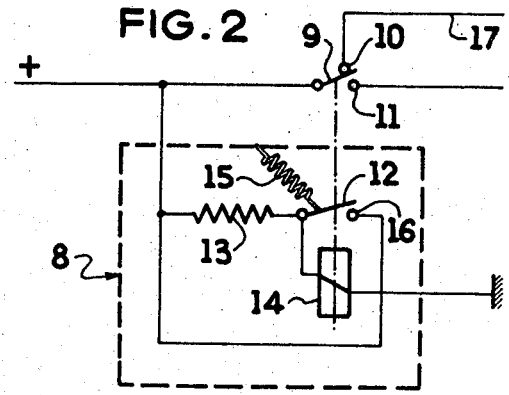
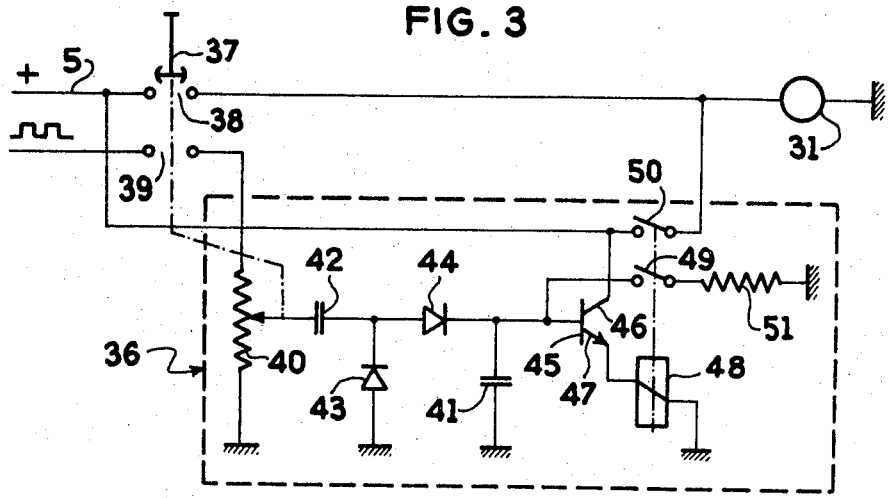

ELECTRICAL SYSTEM FOR AN AUTOMATIC VEHICLE

The present invention relates to electrical systems for automobile vehicles and more particularly concerns the utilization of a central cadenced signal generator normally employed for vehicle direction-changing indicators.

The flashing stations at present employed are caused to operate in a rhythmical or cadenced manner by the opening and closing of a moving contact actuated by deformations of a wire or bimetal element heated by the current supplying the direction-changing indicator lights. By its very conception such a station only operates for values of intensity within a restricted range which forbids the operation of a variable number of receiving apparatuses. In particular, it is not possible to connect to a normal direction-changing indicator station additional direction-changing indicators, for example carried by a caravan or trailer. Moreover, it is not possible to use it to achieve the simultaneous operation of all the direction-changing indicators to produce the danger signal required by certain regulations or to operate in an intermittent manner the various signaling indicators on the dashboard or instrument panel of the vehicle, which would be desirable since a flashing signal is more easily noticed by the driver.

An object of the invention is to provide an electrical system whereby it is possible to employ a single cadenced signal generator for actuating any number of apparatuses and retaining the constancy of the cadenced operation, irrespective of the number of apparatuses operating simultaneously.

The invention provides an electrical system for an automobile vehicle and comprising a source of d-c current, a plurality of apparatuses to be supplied with power from said source, a main switch comprising an "on" contact, a second switch, and a line connecting the second switch in series between the source and those of said apparatuses for which a cadenced operation is desired, and a cadenced signal generator connected between the "on" contact of the main switch and ground for actuating said second switch.

Owing to this arrangement, the generator is supplied with power independently of the apparatuses and can therefore control any number of apparatuses.

Further features and advantages of the invention will be apparent from the ensuing description with reference to the accompanying drawings.

In the drawings:

FIG. 2 is a diagram of one embodiment of the device for achieving a cadenced or rhythmic operation, and FIG. 3 is an embodiment of a frequency divider employed in the system.

Figure 1:
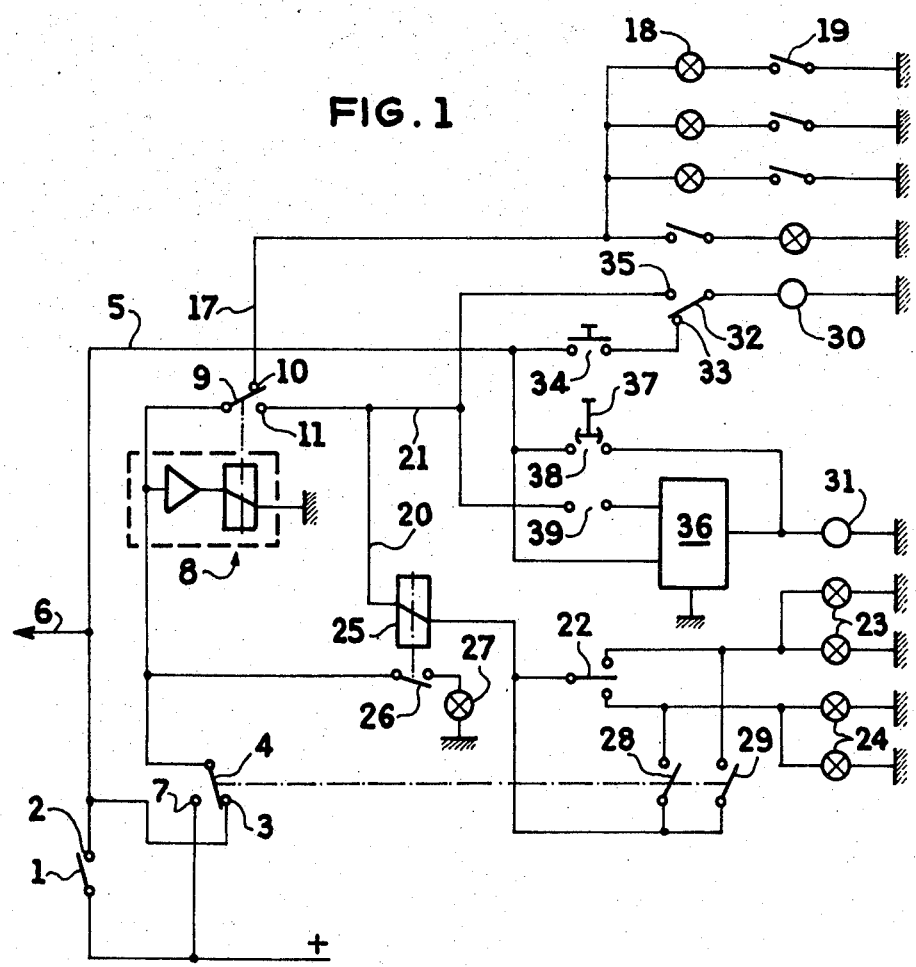
FIG. 1 is a block diagram of an electrical system according to the invention.

FIG. 1 shows a main switch 1 and its "on" contact 2 controlling a source of d-c current (not shown). Connected to this "on" contact 2 are:

a contact 3 of a reversing switch 4;

a line 5 adapted to supply d-c current to apparatuses in respect of which either continuous operator or cadenced operation is desired;

a line 6 intended for all other utilizations to which the invention is not related.

The second contact 7 of the reversing switch 4 is directly connected to the source of current by bypassing the switch 1.

Connected between the reversing switch 4 and ground is a known cadenced signal generator 8, also known as a cadencer which may be of any type, namely an electromagnetic or electrothermal device which is controlled or not by a transistor circuit. This cadencer actuates a switch 9 having two positions which connect the source of d-c current alternately to a contact 10 and to a contact 11. This switch constitutes the second switch mentioned in the foregoing definition of the system according to the invention.

An embodiment of the cadencer is shown in more detail in FIG. 2. It comprises a moving blade 12 having a heating wire 13 connected between the source of current and a grounded coil 14. A spring 15 biases the blade away from a fixed contact 16 which is connected to the source of current in parallel with the wire 13.

The contact 10 of the switch 9 is connected by a conductor 17 to a group of lights, such as 18, for indicating and/or signalling, placed on the instrument panel of the vehicle. Each indicator is connected in series with a switch, such as 19, which is connected to the device or the part of the vehicle to be supervised.

By way of a non-limitative example of the type of these various indicators there may be mentioned:

Indicator showing brake pad wear.
Oil pressure indicator.
Choke indicator.
Steering assistance indicator.
Hand brake release indicator.

The contact 11 of the switch 9 supplies power to two main circuits 20 and 21. The circuit 20 leads to the lever 22 actuating the left turning indicator 23 and right turning indicator 24. A coil 25, connected in series with the lever 22, is provided for closing a switch 26 connected between the reversing switch 4 and a repeating indicator 27 solely when the coil carries the current corresponding to normal operation of all the lights situated on the same side of the vehicle so that it is possible to become aware of non-operation of one thereof, by the absence of flashing of the repeating device.

Two switches 28 and 29, which are normally open, can simultaneously connect the indicators 23 and 24 to the circuit 20. The switches 28 and 29 are connected to the reversing switch 4 so that, when they are closed, the reversing switch 4 is switched to the contact 7.

The circuit 21 supplies power to certain apparatuses which it might be of interest to operate in a rhythmic or cadenced manner. By way of example, there is shown a motor 30 of the pump for the windscreen washer and a motor 31 of a windscreen wiper. A switch 32, connected in series with the motor 30, is in its normal state of rest on a contact 33 connected by a pushbutton 34 to the line 5. In this position, the motor of the windscreen washer can be actuated as desired by depressing the pushbutton 34. If a rhythmic permanent operation of the motor 30 is desired, it is sufficient to shift the switch 32 to the contact 35 connected to the circuit 21. The windscreen wiper motor 31 can be supplied with power either in a continuous manner from the line 5 or in an intermittent manner from the circuit 21 after interposition of a frequency divider 36 of known type which results in a suitable wiper sweep rhythm. A control device 37, constituted by a pull-rod or rotary knob, closes, in the first case, the contacts 38 and, in the second case, the contacts 39.

FIG. 3 shows by way of example an embodiment of a frequency reducer. A potentiometer 40, which can be actuated by the control device 37, regulates the intensity of the signals received from the cadencer 8, so that it is possible to act on the output frequency of the frequency divider 36. These signals charge progressively a capacitor 41 through a cycling circuit constituted by a capacitor 42 and two diodes 43 and 44. The capacitor 41 is connected to the base of a transistor 45 whose collector 46 is connected to the line 5 and whose emitter 47 is connected to a coil 48. This transistor 45 acts as an amplifier and, when the coil 48 carries sufficient current, it closes the contacts 49 and 50 and ensures, on one hand, the discharge of the capacitor 41 through a resistor 51 and, on the other hand, the operation of the motor 31. When the capacitor 41 has discharged, the current in the coil 48 becomes insufficient and this once again opens the contacts 49 and 50. The cycle is repeated at a frequency regulated at will by the potentiometer 40.

The system operates in the following manner:

So long as the main switch 1 is not brought to the "on" position, the coil 14 carries no current and the switch 9 remains on the contact 10 (FIG. 2). When the switch 1 is brought to the "on" position, a voltage is connected across the cadencer and the current which passes through the wire 13 and the coil 14 is insufficient to shift the moving part, but the heating of the wire 13 causes the displacement of the blade 12 which comes in contact with the contact 16. The wire 13 is then short-circuited. As the core carries a higher current, it shifts the moving part and switches the switch 9 to the contact 11. When the wire 13 has cooled sufficiently, the spring 15 returns the blade 12 in a direction away from the contact 16 and the cycle is reproduced indefinitely so long as current is supplied to the cadencer 8. The frequency of operation can be for example of the order of 0.5 Hertz.

The various circuits located on the downstream side of the switch 9 can therefore be supplied with power in a cadenced manner through this switch when they are brought into action by their switches 19 ; 32 ; 34 ; 37; 22 respectively.

The alternating operation of the indicators 8 has the advantage of drawing the attention of the driver much more effectively than a simple fixed illumination.

The motor 30 of the windscreen washer can be supplied with power either through 5, 34, 33, 32 (manual control and continuous operation) or through 21, 35, 32 (automatic control and cadenced operation), and the motor 31 of the windscreen wiper can be supplied with power either through 5, 37, 38 (continuous operation) or through 21, 37, 39, 36 (intermittent operation), as mentioned hereinbefore.

As concerns the direction-changing indicators, they are controlled in the normal manner by the lever 22 and can be supplied with power simultaneously and in a cadenced manner if the user brings the coupled switches 28, 29 to the closed position which causes the closing of the switch 4 and the by-passing of the main switch 1. Thus in the event of a breakdown or accident, it is possible to bring into action the "danger" signal required by the regulations of certain countries even when the main switch is open.

Thus it can be seen that this system achieves the cadenced operation of a high number of apparatuses by means of a single generator of known type.

It must be understood that these embodiments have been given merely by way of example since other apparatuses may be made to operate by the same cadencer. Further, the manner in which the windscreen washing and windscreen wiping motors are connected has been given merely by way of example. The motor of the windscreen washer pump could just as well be connected to the output of the frequency divider.

Further, note that the presence of the two contacts 10 and 11 of the switch 9 is not essential and that the conductor 17 could be connected to the contact 11. However, the arrangement described and illustrated has two advantages, namely it reduces the intensity across the contacts and maintains the signalling indicators, such as 18, in operation in the event of breakdown of the cadencer.

Having now described my invention what I claim as new and desire to secure by Letters Patent is:

1. An electrical system for an automobile vehicle, comprising a source of d-c current, a first group of apparatuses which must be supplied with power from said source in a cadenced operation mode and a second group of apparatuses which must be supplied with power from said source either in a cadenced or in a continuous operation mode, a main switch comprising an "on" contact, circuits connecting said apparatuses to said source through said main switch, a second switch, and a line connecting the second switch in series between the source and said apparatuses, a cadenced signal generator connected between the "on" contact of the main switch and ground for actuating said second switch and a direct supply line connected between said main switch and third switches respectively inserted in series between said second switch and each of apparatuses of said second group for switching the same from said cadenced operation mode to said continuous operation mode.

2. A system as claimed in claim 1, wherein said apparatuses of said first group comprise direction-changing indicators and signalling and warning indicators mounted on the instrument panel of the vehicle and said apparatuses of said second group comprise a windscreen washer motor and a windscreen wiper motor.

3. A system as claimed in claim 2, wherein said second switch is a switch having two positions and first and second contacts, said first contact being connected to said windscreen washer motor and to said windscreen wiper motor through respective third switches and to said direction-changing 4. A system as claimed in claim 1, wherein at least one of said apparatuses of said second group must be supplied in a cadenced operation mode at a rate lower than the frequency of said second switch, said system comprising a frequency divider interposed between the second switch and said at least one of the apparatuses of said second group.

5. A system as claimed in claim 1, comprising vehicle direction-changing indicators, a fourth switch for simultaneously actuating the indicators, a fifth switch connected to be actuated at the same time as said fourth switch, a supply line for supplying power to the signal generator and to the second switch in parallel with the main switch, said supply line being controlled by said fifth switch.

* * * * *